(12) United States Patent
Uotome et al.

(10) Patent No.: US 10,676,631 B2
(45) Date of Patent: Jun. 9, 2020

(54) INK SET FOR INK-JET PRINTING AND INK-JET RECORDING METHOD

(71) Applicant: Maxell Holdings, Ltd., Kyoto (JP)

(72) Inventors: Katsuya Uotome, Osaka (JP); Katsuyuki Kito, Osaka (JP); Kaori Kitabatake, Osaka (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 0 days.

(21) Appl. No.: 16/083,777

(22) PCT Filed: Feb. 28, 2017

(86) PCT No.: PCT/JP2017/007968
§ 371 (c)(1),
(2) Date: Sep. 10, 2018

(87) PCT Pub. No.: WO2017/154683
PCT Pub. Date: Sep. 14, 2017

(65) Prior Publication Data
US 2019/0077981 A1    Mar. 14, 2019

(30) Foreign Application Priority Data
Mar. 11, 2016 (JP) .................. 2016-048698

(51) Int. Cl.
| C09D 11/54 | (2014.01) |
| C09D 11/322 | (2014.01) |
| B41J 2/01 | (2006.01) |
| B41J 11/00 | (2006.01) |
| B41M 5/00 | (2006.01) |
| C09D 11/38 | (2014.01) |
| C09D 11/40 | (2014.01) |

(52) U.S. Cl.
CPC ............ *C09D 11/54* (2013.01); *B41J 2/01* (2013.01); *B41M 5/00* (2013.01); *C09D 11/322* (2013.01); *C09D 11/38* (2013.01); *C09D 11/40* (2013.01)

(58) Field of Classification Search
None
See application file for complete search history.

(56) References Cited

U.S. PATENT DOCUMENTS

| 8,511,810 B2 | 8/2013 | Aoyama et al. |
| 8,783,842 B2 | 7/2014 | Ingle et al. |
| 9,944,810 B2 | 4/2018 | Yamazaki et al. |
| 2009/0246479 A1 | 10/2009 | Mukai et al. |
| 2009/0258203 A1 | 10/2009 | Aoyama et al. |
| 2010/0055325 A1* | 3/2010 | Sakai .................. B41M 5/0017 427/261 |
| 2010/0075044 A1* | 3/2010 | Kato .................... C09D 11/322 427/256 |
| 2011/0037805 A1 | 2/2011 | Arai et al. |
| 2011/0050790 A1 | 3/2011 | Irita |
| 2011/0074866 A1 | 3/2011 | Imamura et al. |
| 2012/0128949 A1* | 5/2012 | Goto .................... B41M 5/0017 428/207 |
| 2015/0274992 A1* | 10/2015 | Aoyama ............... C09D 11/54 347/21 |
| 2016/0083603 A1* | 3/2016 | Okuda .................. C09D 11/54 347/21 |
| 2016/0250861 A1* | 9/2016 | Yano .................... B41J 2/2107 347/21 |
| 2017/0166768 A1* | 6/2017 | Matsuzaki ............ C09D 11/54 |
| 2017/0292035 A1* | 10/2017 | Saito .................... B41J 2/01 |
| 2018/0086112 A1* | 3/2018 | Matsuzaki ........... C09D 11/322 |
| 2018/0236783 A1* | 8/2018 | Matsuzaki ........... B41M 5/0011 |
| 2018/0236787 A1* | 8/2018 | Kagata ................. B41M 5/0017 |
| 2018/0244094 A1* | 8/2018 | Okuda .................. B41J 11/002 |
| 2019/0092959 A1* | 3/2019 | Matsuzaki ............ C09D 11/54 |

FOREIGN PATENT DOCUMENTS

| EP | 2 221 351 A1 | 8/2010 |
| EP | 2 889 148 A1 | 7/2015 |
| JP | 2009-242441 A | 10/2009 |
| JP | 2009-262549 A | 11/2009 |
| JP | 2010-023265 A | 2/2010 |
| JP | 2010-023266 A | 2/2010 |
| JP | 2015-227003 A | 12/2015 |
| JP | 5862913 B1 | 2/2016 |

OTHER PUBLICATIONS

English translation of JP 2015/227003, Dec. 2015; 53 pages.*
International Search Report issued in corresponding International Patent Application No. PCT/JP2017/007968, dated May 16, 2017, with English Translation.
International Preliminary Report on Patentability dated Sep. 11, 2018, issued in International Patent Application No. PCT/JP2017/007968, with English Translation.
Extended European Search Report issued in corresponding European Patent Application No. 17763023.3-1102, dated Oct. 1, 2019.

* cited by examiner

Primary Examiner — Helene Klemanski
(74) Attorney, Agent, or Firm — McDermott Will & Emery LLP

(57) ABSTRACT

There is provided an ink set for ink-jet printing comprising an aqueous ink and a reaction liquid, wherein the aqueous ink contains an emulsion, a surfactant, an organic solvent, a pigment, and water, the reaction liquid contains an aggregating agent, 1,2-alkanediol, a glycol ether-based solvent and/or a glycol ether acetate-based solvent, and water, and the emulsion has a glass transition temperature of 50° C. or higher. The ink set for ink-jet printing is provided with an aqueous ink excellent in the discharge stability, and can form an image excellent in coated film properties such as the rubbing resistance and the adherence.

10 Claims, No Drawings

INK SET FOR INK-JET PRINTING AND INK-JET RECORDING METHOD

CROSS REFERENCE

This application is the U.S. National Phase under 35 U.S.C. § 371 of International Application No. PCT/JP2017/007968, filed on Feb. 28, 2017, which claims the benefit of Japanese Application No. 2016-048698, filed on Mar. 11, 2016, the entire contents of each are hereby incorporated by reference.

TECHNICAL FIELD

The present invention relates to an ink set for ink-jet printing and an ink-jet recording method using the ink set for ink-jet printing.

BACKGROUND ART

As one of methods of recording an image, a letter, a pattern, and the like (hereinafter, these are collectively referred to as image) on a recording medium using ink, there is an ink-jet system. Heretofore, as the ink used in an ink-jet system (hereinafter, referred to as ink for ink-jet), many aqueous inks that form an image on a substrate having the ink absorbability, such as paper and cloth, have been proposed. Meanwhile, in recent years, an aqueous ink that can also form an image on a substrate having no ink absorbability (hereinafter, referred to as non-absorbing substrate) such as resin film, plastic, and metal, or a substrate having the low ink absorbability (hereinafter, referred to as low-absorbing substrate) has been proposed. In addition, an image is formed by volatilization of a solvent such as water and an organic solvent contained in the aqueous ink, on the surface of a recording medium.

Since on the surface of a non-absorbing substrate or a low-absorbing substrate, the conventional aqueous ink does not permeate the substrate, and is deposited on the surface of the substrate, a drying speed is slow. For that reason, when the aqueous ink is discharged on the surface of the non-absorbing substrate or the low-absorbing substrate, if the time until the aqueous inks are brought into contact with each other on the substrate surface is short, there is a possibility that the aqueous inks are brought into contact with each other while the aqueous inks are not sufficiently dried. Hence, on an image that is formed on the surface of the non-absorbing substrate or the low-absorbing substrate, beading (phenomenon that adjacent dots are connected, and irregular gaps and concentration unevenness are generated), and inter-color bleeding are easily generated.

Then, printing systems using an aqueous ink and a reaction liquid (color-fixing agent) have been variously provided, as constituent features that can suppress generation of beading and inter-color bleeding, regardless of an interval between discharges of the aqueous ink, in an image that is formed on the surface of the non-absorbing substrate or the low-absorbing substrate. For example, Patent Document 1 discloses a printing system using an aqueous ink containing an anionic pigment dispersant, a latex (emulsion), a surfactant, a co-solvent, a coloring agent, water, and the like, and a color-fixing agent containing a cationic polymer, a surfactant, water, and the like.

PRIOR ART DOCUMENT

Patent Document

Patent Document 1: U.S. Pat. No. 8,783,842

SUMMARY OF THE INVENTION

Problems to be Solved by the Invention

The aqueous ink containing an emulsion, generally, contains a film-forming aid such as a glycol ether-based solvent, and a glycol ether acetate-based solvent, in order to improve the film formability. By containing the film-forming aid of the aqueous ink, an emulsion contained in an image formed on the surface of a recording medium sufficiently sticks thereto to form a film, and the film strength originally possessed by an emulsion can be sufficiently manifested. For that reason, in the image, coated film properties such as the rubbing resistance are improved. Meanwhile, by the film-forming aid, an emulsion in the aqueous ink becomes easier to form a film by drying at an ambient temperature. For that reason, when the aqueous ink is discharged from an ink-jet head, at or near a nozzle, a nozzle is easily clogged by the dried product of an emulsion. As a result, there was a problem that deteriorated discharge such as non-discharge and flight defection of the aqueous ink became easy to be generated.

Additionally, usually, when a film formation temperature of an emulsion is lower than a drying temperature (generally, 60 to 100° C.), the aqueous ink is easily formed into a film. However, when a film formation temperature of an emulsion is lower than a drying temperature, since an emulsion contained in the aqueous ink is solidified at or near a nozzle upon discharge of the aqueous ink from an ink-jet head, the nozzle is easily clogged. Then, generally, a film formation temperature of an emulsion is set at higher than a drying temperature. However, when a film formation temperature of an emulsion is higher than a drying temperature, since the adherence between particles of an emulsion becomes weak at a drying stage, film formation becomes insufficient. As a result, there was a problem that the rubbing resistance and the adherence were inferior.

The present invention was made in view of the above-mentioned present situation, and an object thereof is to provide an ink set for ink-jet printing, which is provided with an aqueous ink excellent in the discharge stability, and can form an image excellent in coated film properties such as the rubbing resistance and the adherence.

Solutions to the Problems

The present inventors variously studied the problem, and obtained the finding that by containing a glycol ether-based solvent and/or a glycol ether acetate-based solvent as a film-forming aid not in an aqueous ink but in a reaction liquid, and adjusting a glass transition temperature of an emulsion contained in the aqueous ink at 50° C. or higher, the discharge stability of the aqueous ink is improved, and a formed image is excellent in coated film properties such as the rubbing resistance and the adherence.

The present invention was made based on the above-mentioned finding, and constituent features thereof are as follows:

[1] An ink set for ink-jet printing comprising an aqueous ink and a reaction liquid, wherein the aqueous ink contains an emulsion, a surfactant, an organic solvent, a pigment, and water, the reaction liquid contains an aggregating agent, 1,2-alkanediol, a glycol ether-based solvent and/or a glycol ether acetate-based solvent, and water, and the emulsion has a glass transition temperature of 50° C. or higher.

[2] The ink set for ink-jet printing according to [1], wherein the glycol ether-based solvent is one or more selected from diethylene glycol monobutyl ether, diethylene glycol methyl ethyl ether, triethylene glycol monobutyl ether, triethylene glycol dimethyl ether, dipropylene glycol monobutyl ether, dipropylene glycol monomethyl ether, tripropylene glycol monomethyl ether, and tripropylene glycol dimethyl ether.

[3] The ink set for ink-jet printing according to [1] or [2], wherein the reaction liquid does not contain a surfactant.

[4] The ink set for ink-jet printing according to any one of [1] to [3], wherein the reaction liquid has a dynamic contact angle after 3 seconds from contact with a recording medium of 40° or less.

[5] The ink set for ink-jet printing according to any one of [1] to [4], wherein the aggregating agent is a water-soluble cationic polymer.

[6] An ink-jet recording method for forming an image on a recording medium using the ink set for ink-jet printing as defined in any one of [1] to [5], comprising discharging an aqueous ink and a reaction liquid from an ink-jet head so as to bring the aqueous ink and the reaction liquid into contact with each other on the recording medium.

[7] The ink-jet recording method according to [6], wherein the recording medium is composed of a non-absorbing substrate or a low-absorbing substrate.

Effects of the Invention

According to the present invention, there can be provided an ink set for ink-jet printing, which is provided with an aqueous ink excellent in the discharge stability, and can form an image excellent in coated film properties such as the rubbing resistance and the adherence.

EMBODIMENTS OF THE INVENTION

One embodiment of the present invention (hereinafter, also referred to as present embodiment) will be illustrated in detail below. The present invention is not limited to the following content:

1. Ink Set for Ink-Jet Printing

An ink set for ink-jet printing according to the present embodiment comprises an aqueous ink and a reaction liquid, in which the aqueous ink contains an emulsion, a surfactant, an organic solvent, a pigment, and water, the reaction liquid contains an aggregating agent, 1,2-alkanediol, a glycol ether-based solvent and/or a glycol ether acetate-based solvent, and water, and the emulsion has a glass transition temperature of 50° C. or higher.

<Aqueous Ink>

The aqueous ink contains an emulsion, a surfactant, an organic solvent, a pigment, and water.

(Emulsion)

An emulsion is a component that forms an image excellent in coated film properties such as the rubbing resistance, by improving the film formability of an aqueous ink. In the ink set for ink-jet printing according to the present embodiment, the aqueous ink does not contain a film-forming aid. For that reason, the emulsion becomes difficult to form a film by drying at an ambient temperature, thereby, when the aqueous ink is discharged from an ink-jet head, it becomes difficult to form a film at or near a nozzle. As a result, the discharge stability of the aqueous ink can be secured.

A glass transition temperature of the emulsion is 50° C. or higher. When a glass transition temperature of the emulsion is lower than 50° C., the discharge stability from an ink-jet head becomes bad. It is preferable that a glass transition temperature of the emulsion is 120° C. or lower, so as to be lower than a drying temperature (60 to 100° C.) of a general printer. In addition, in the present description, the "emulsion" means an emulsified resin, and does not include a dispersing medium of the emulsion. Additionally, the "glass transition temperature of an emulsion" refers to a glass transition temperature obtained by drying and dehydrating an aqueous solution containing an emulsion (emulsion dispersion) at 150° C. for 2 hours, and measuring a glass transition temperature of the resulting emulsion alone.

Examples of a resin constituting the emulsion include styrene, tetrahydrofurfuryl acrylate, butyl (meth)acrylate, (α,2,3 or 4)-alkylstyrene, (α,2,3 or 4)-alkoxystyrene, 3,4-dimethylstyrene, α-phenylstyrene, divinylbenzene, vinylnaphthalene, dimethylamino(meth)acrylate, dimethylaminoethyl (meth)acrylate, dimethylaminopropylacrylamide, N,N-dimethylaminoethyl acrylate, acryloylmorpholine, N,N-dimethylacrylamide, N-isopropylacrylamide, N,N-diethylacrylamide, methyl (meth)acrylate, ethyl (meth)acrylate, propyl (meth)acrylate, ethylhexyl (meth)acrylate, other alkyl (meth)acrylates, methoxydiethylene glycol (meth)acrylate, (meth)acrylate of diethylene glycol or polyethylene glycol having an ethoxy group, (meth)acrylate of diethylene glycol or polyethylene glycol having a propoxy group, (meth)acrylate of diethylene glycol or polyethylene glycol having a butoxy group, cyclohexyl (meth)acrylate, benzyl (meth)acrylate, phenoxyethyl (meth)acrylate, isobornyl (meth)acrylate, hydroxyalkyl (meth)acrylate, other fluorine-containing (meth)acrylates, chlorine-containing (meth)acrylates, silicon-containing (meth)acrylates, and the like. Additionally, when in addition to monofunctionality such as (meth)acrylamide, maleic acid amide, and (meth)acrylic acid, a crosslinked structure is introduced, examples include (mono, di, tri, tetra, poly)ethylene glycol di(meth)acrylates, di(meth)acrylates of 1,4-butanediol, 1,5-pentanediol, 1,6-hexanediol, 1,8-octanediol, 1,10-decanediol or the like, trimethylolpropane tri(meth)acrylate, glycerin (di, tri)(meth)acrylates, di(meth)acrylates of an ethylene oxide adduct of bisphenol A or F, neopentyl glycol di(meth)acrylate, pentaerythritol tetra(meth)acrylate, dipentaerythritol hexa(meth)acrylate, and the like.

It is preferable that the content of the emulsion is 3 to 30 parts by weight, based on 100 parts by weight of the whole aqueous ink. When the content of the emulsion is less than 3 parts by weight, a film having the sufficient film strength cannot be formed in some cases. On the other hand, when the content of the emulsion exceeds 30 parts by weight, the viscosity of the aqueous ink becomes too high in some cases, and unevenness of a printed matter becomes large in some cases. The content of the emulsion is more preferably 5 parts by weight or more, and more preferably 20 parts by weight or less, based on 100 parts by weight of the whole aqueous ink.

(Surfactant)

A surfactant is a component that improves the wettability to a recording medium.

Examples of the surfactant include silicone-based surfactants, fluorine-based surfactants, acetylene glycol-based surfactants, polyoxyalkylene alkyl ethers, and the like.

It is preferable that the silicone-based surfactant is a polysiloxane-based compound. Examples of the polysiloxane-based compound include polyether-modified siloxane, polyether-modified polydimethylsiloxane, polyether-modified organosiloxane, and the like. Specifically, examples include BYK-306, BYK-307, BYK-333, BYK-341, BYK-345, BYK-346, BYK-348 (the foregoing are trade names, manufactured by BYK-Chemie Japan K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (the foregoing are trade names, manufactured by Shin-Etsu Chemical Co., Ltd.), and the like. These may be used alone, or two or more of them may be used in combination.

It is preferable that the content of the surfactant is 0.1 to 5.0 parts by weight, based on 100 parts by weight of the whole aqueous ink. When the content of the surfactant is less than 0.1 part by weight, the aqueous ink is not sufficiently wettedly spread on a substrate in some cases. On the other hand, when the content of the surfactant exceeds 5.0 parts by weight, an excessive surfactant bleeds on the coated film surface in some cases, and the adherence of the aqueous ink to a substrate is inferior in some cases. The content of the surfactant is more preferably 0.5 part by weight or more, and more preferably 3.0 parts by weight or less, based on 100 parts by weight of the whole aqueous ink.

(Organic Solvent)

An organic solvent is a component that adjusts the drying property of the aqueous ink and the wettability of the aqueous ink on a substrate.

It is preferable that the organic solvent is an organic solvent that hardly plasticizes an emulsion. It is preferable that such an organic solvent is polyhydric alcohols and/or pyrrolidone derivatives. Examples of the polyhydric alcohols include ethylene glycol, diethylene glycol, triethylene glycol, propylene glycol, dipropylene glycol, 1,2-propanediol, 1,3-propanediol, 1,2-butanediol, 1,3-butanediol, 1,4-butanediol, 2,3-butanediol, 2,2-dimethyl-1,3-propanediol, 2-methyl-1,3-propanediol, 1,2-pentanediol, 1,5-pentanediol, 2,4-pentanediol, 1,2-hexanediol, 3,5-dimethyl-3-hexyne-2,5-diol, 2,5-hexanediol, hexylene glycol, 1,6-hexanediol, 2-ethyl-1,3-hexanediol, 2,2,4-trimethyl-1,3-pentanediol, 2,5-dimethyl-2,5-hexanediol, 1,4-cyclohexanedimethanol, 2,2-thiodiethanol, and the like. Examples of the pyrrolidone derivatives include 2-pyrrolidone, N-methyl-2-pyrrolidone, and the like. Examples of the organic solvent other than the polyhydric alcohols and the pyrrolidone derivatives include 3-pyridylcarbinol, sulfolane, and the like. When a boiling point and safety are considered, among them, polyhydric alcohols having a SP value (solubility parameter) of 11 or more are more preferable, and one or more selected from 1,3-butanediol, 2-methyl-1,3-propanediol, ethylene glycol, and propylene glycol are further preferable.

The organic solvent does not contain a component that improves the film formability of the emulsion. Examples of the organic solvent that improves the film formability of the emulsion include a glycol ether-based solvent, a glycol ether acetate-based solvent, and the like.

It is preferable that the content of the organic solvent is 5 to 40 parts by weight, based on 100 parts by weight of the whole aqueous ink. When the content of the organic solvent is less than 5 parts by weight, a drying speed becomes too fast, and the discharge stability is inferior in some cases. On the other hand, when the content of the organic solvent exceeds 40 parts by weight, an emission amount of a volatile organic compound (VOC) becomes large, and a problem is caused in safety, in some cases. Additionally, when an attempt to secure safety is tried, since exhaust facilities for exhausting VOC become necessary, the facility cost is increased in some cases. The content of the organic solvent is more preferably 10 parts by weight or more, and more preferably 30 parts by weight or less, based on 100 parts by weight of the whole aqueous ink.

(Pigment)

As a pigment, the previously known inorganic pigments and organic pigments can be used. These may be used alone, or two or more of them may be used in combination.

Examples of the inorganic pigment include titanium oxide, zinc white, zinc oxide, Tripon, iron oxide, aluminum oxide, silicon dioxide, kaolinite, montmorillonite, talc, barium sulfate, calcium carbonate, silica, alumina, cadmium red, rouge, molybdenum red, chrome vermillion, molybdate orange, lead yellow, chrome yellow, cadmium yellow, yellow iron oxide, titanium yellow, chromium oxide, piridian, cobalt green, titanium cobalt green, cobalt chromium green, ultramarine, ultramarine blue, Prussian blue, cobalt blue, cerulean blue, manganese violet, cobalt violet, mica, and the like. These may be used alone, or two or more of them may be used in combination.

Examples of the organic pigment include azo-based, azomethine-based, polyazo-based, phthalocyanine-based, quinacridone-based, anthraquinone-based, indigo-based, thioindigo-based, quinophthalone-based, benzimidazolone-based, and isoindoline-based organic pigments, and the like. Additionally, as the organic pigment, carbon black composed of acidic, neutral or basic carbon, hollow particles of a crosslinked acrylic resin, and the like can also be used. These may be used alone, or two or more may be used in combination.

The content of the pigment is preferably 0.1 part by weight or more, and more preferably 0.3 part by weight or more, based on 100 parts by weight of the whole aqueous ink. Additionally, the content of the pigment is preferably 15 parts by weight or less, and more preferably 10 parts by weight or less, based on 100 parts by weight of the whole aqueous ink.

(Water)

Examples of water include ion-exchanged water, distilled water, tap water, well water, and the like. From a view point of a relatively small content of impurities and availability at the inexpensive cost, among them, ion-exchanged water is preferable.

The aqueous ink can contain another additive as necessary, in such a range that the effect of the present invention is not impaired. Examples of another additive include anti-fungal agents, chelate agents, pH adjusting agents, rust-preventing agents, and the like.

The aqueous ink can be produced by uniformly mixing the emulsion, the surfactant, the organic solvent, the pigment, the water, and as necessary, another additive using a mixing stirring device or the like, without particular limitation.

In the thus produced aqueous ink, from a view point that the dischargeability from an ink-jet head is improved, the viscosity at 25° C. is preferably 1 to 15 mPa·s. In addition, measurement of the viscosity of the aqueous ink can be performed using a R100-type viscometer, in accordance with JIS Z 8803.

<Reaction Liquid>

The reaction liquid contains an aggregating agent, 1,2-alkanediol; a glycol ether-based solvent and/or a glycol ether acetate-based solvent; and water. In addition, it is preferable that the reaction liquid does not contain a surfactant. The aqueous ink contains a surfactant as an essential component.

For that reason, when the reaction liquid also contains a surfactant, the adherence of a formed image is inferior in some cases.

Examples of the surfactant that is not contained by the reaction liquid include nonionic surfactants, cationic surfactants, and amphoteric surfactants.

Examples of the nonionic surfactants include ether-based surfactants such as polyoxyethylene nonyl phenyl ether, polyoxyethylene octyl phenyl ether, polyoxyethylene dodecyl phenyl ether, polyoxyethylene alkyl allyl ether, polyoxyethylene oleyl ether, polyoxyethylene lauryl ether, polyoxyethylene alkyl ether, and polyoxyalkylene alkyl ether (polyoxypropylene polyoxyethylene alkyl ether); ester-based surfactants such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate, and polyoxyethylene stearate; fluorine-containing surfactants such as fluorine alkyl ester; silicone-containing surfactants such as polyether silicone; and the like.

Examples of the cationic surfactants include alkylamine salts such as coconut amine acetate and stearyl amine acetate, quaternary ammonium salts such as lauryltrimethylammonium chloride, stearyltrimethylammonium chloride, and alkylbenzyldimethylammonium chloride, alkyl betaines such as lauryl betaine and stearyl betaine, amine oxides such as lauryldimethylamine oxide and the like.

Examples of the amphoteric surfactants include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, imidazoline derivatives, and the like.

(Aggregating Agent)

An aggregating agent is a component that aggregates the emulsion and the pigment, which is contained in the aqueous ink. Examples of the aggregating agent include water-soluble cationic polymers, cationic emulsions, polyvalent metal salts, and the like. From a view point of material selectivity considering the cost, a molecular weight, a molecular structure, and the like, among them, the water-soluble cationic polymer is preferable. In addition, the aggregating agent does not contain a surfactant.

Examples of the water-soluble cationic polymer include a dimethylamine-epichlorhydrin copolymer, an acrylamide-diallyldimethylammonium chloride copolymer, polydiallyldimethylammonium chloride, polyallylamine, a dicyandiamide-diethylenetriamine copolymer, and the like. These may be used alone, or two or more of them may be used in combination.

It is preferable that the content of the aggregating agent is 0.5 to 10 parts by weight, based on 100 parts by weight of the whole reaction liquid. When the content of the aggregating agent is less than 0.5 part by weight, the cohesive force is weak, and the sufficient bleeding-preventing effect is not obtained in some cases. On the other hand, when the content of the aggregating agent exceeds 10 parts by weight, coated film properties such as the water resistance and the solvent resistance of a coated film are inferior in some cases. The content of the aggregating agent is more preferably 2 parts by weight or more, and more preferably 6 parts by weight or less, based on 100 parts by weight of the whole reaction liquid.

(1,2-Alkanediol)

1,2-Alkanediol is a component that adjusts a drying speed of a reaction liquid, and enhances the wettability on a substrate. Examples of the 1,2-alkanediol include 1,2-propanediol, 1,2-butanediol, 1,2-pentanediol, 1,2-hexanediol, 1,2-heptanediol, 1,2-octanediol, and the like. These may be used alone, or two or more of them may be used in combination. From a view point of a boiling point, and improving the wettability on a substrate, 1,2-hexanediol, 1,2-heptanediol, or 1,2-octanediol is preferable.

It is preferable that the content of the 1,2-alkanediol is 0.1 to 10 parts by weight, based on 100 parts by weight of the whole reaction liquid. When the content of the 1,2-alkanediol is less than 0.1 part by weight, the reaction liquid does not have the sufficient wettability in some cases. On the other hand, when the content of the 1,2-alkanediol exceeds 10 parts by weight, the 1,2-alkanediol destabilizes a reaction liquid to cause liquid separation in some cases. Additionally, an emission amount of a volatile organic compound (VOC) is increased, and a problem is generated in safety in some cases. Additionally, since when an attempt to secure safety is tried, exhaust facilities for exhausting VOC become necessary, the facility cost is increased in some cases. The content of the 1,2-alkanediol is more preferably 1 part by weight or more, and more preferably 3 parts by weight or less, based on 100 parts by weight of the whole reaction liquid.

(Glycol Ether-Based Solvent and/or Glycol Ether Acetate-Based Solvent)

A glycol ether-based solvent and/or a glycol ether acetate-based solvent are a component that improves the film formability of an emulsion, and forms an image excellent in the rubbing resistance and the adherence with a substrate. Examples of the glycol ether-based solvent include diethylene glycol monobutyl ether, diethylene glycol methyl ethyl ether, triethylene glycol monobutyl ether, triethylene glycol dimethyl ether, dipropylene glycol monobutyl ether, dipropylene glycol monomethyl ether, tripropylene glycol monomethyl ether, tripropylene glycol dimethyl ether, and the like. Examples of the glycol ether acetate-based solvent include ethylene glycol butyl ether acetate, diethylene glycol ethyl ether acetate, diethylene glycol butyl ether acetate, propylene glycol monomethyl ether acetate, dipropylene glycol methyl ether acetate, and the like. These may be used alone, or two or more of them may be used in combination. From a view point of a boiling point, among them, one or more selected from diethylene glycol monobutyl ether, dipropylene glycol monobutyl ether, tripropylene glycol monomethyl ether, and tripropylene glycol dimethyl ether are preferable.

It is preferable that the content of the glycol ether-based solvent and/or the glycol ether acetate-based solvent is a total of 1 to 40 parts by weight, based on 100 parts by weight of the whole reaction liquid. When a total of the contents of the glycol ether-based solvent and/or the glycol ether acetate-based solvent is less than 1 part by weight, the film-forming effect of an emulsion is not sufficiently obtained in some cases. On the other hand, when a total of the contents of the glycol ether-based solvent and/or the glycol ether acetate-based solvent exceeds 40 parts by weight, an emission amount of a volatile organic compound (VOC) becomes large, and a problem is generated in safety in some cases. Additionally, since when an attempt to secure safety is tried, exhaust facilities for exhausting VOC become necessary, the facility cost is increased in some cases. The content of the glycol ether-based solvent and/or the glycol ether acetate-based solvent is more preferably a total of 5 parts by weight or more, and more preferably a total of 20 parts by weight or less, based on 100 parts by weight of the whole reaction liquid.

(Water)

Examples of water include ion-exchanged water, distilled water, tap water, well water, and the like. From a view point of a relatively small content of impurities and availability at the inexpensive cost, among them, ion-exchanged water is preferable.

The reaction liquid can contain another additive as necessary, in such a range that the effect of the present invention is not impaired. Examples of another additive include antifungal agents, chelate agents, pH adjusting agents, rust-preventing agents, and the like.

The reaction liquid can be produced, for example, by uniformly mixing the aggregating agent, the 1,2-alkanediol, the glycol ether-based solvent and/or the glycol ether acetate-based solvent, the water, and as necessary, another additive using a mixing stirring device or the like, without particular limitation.

In the thus produced reaction liquid, from a view point that the dischargeability from an ink-jet head is improved, it is preferable that the viscosity at 25° C. is 1 to 15 mPa·s. In addition, measurement of the viscosity of the reaction liquid can be performed using a R100-type viscometer in accordance with JIS Z 8803.

In the reaction liquid, from a view point that the wettability on a substrate is improved, and ink-jet head suitability is improved, it is preferable that a static surface tension is 15 to 40 mN/m. In addition, the static surface tension was measured at 25° C. using a full automatic equilibrium electro surface tension meter ESB-V (manufactured by Kyowa Interface Science Co., LTD.).

In the reaction liquid, from a view point that the bleeding-preventing effect by the reaction liquid is sufficiently exerted, a dynamic contact angle after 3 seconds from contact with a recording medium is 10° or more, and preferably 40° or less. In addition, a dynamic contact angle was measured using a portable contact angle meter PG-X (manufactured by MATSUBO Corporation), by adding 1 μL of the reaction liquid dropwise on a target substrate retained at 40° C., in a dynamic mode.

2. Ink-Jet Recording Method

An ink-jet recording method according to the present embodiment is a method for forming an image on a recording medium using the ink set for ink-jet printing according to the present embodiment, including discharging an aqueous ink and a reaction liquid from an ink-jet head so as to bring the aqueous ink and the reaction liquid into contact with each other on the recording medium. Thereby, an image excellent in coated film properties can be formed on the recording medium.

In the ink-jet recording method according to the present embodiment, while an ink-jet head filled with the aqueous ink and the reaction liquid is moved to a relative position to the recording medium, the aqueous ink and the reaction liquid are discharged to the recording medium from the ink-jet head. The aqueous ink and the reaction liquid may be simultaneously discharged from the ink-jet head, or the aqueous ink may be discharged after discharge of the reaction liquid.

In the ink-jet recording method according to the present embodiment, it is preferable that the aqueous ink and the reaction liquid are discharged from the ink-jet head in a temperature range of 20 to 40° C. Additionally, a temperature of the recording medium at which the aqueous ink and the reaction liquid are discharged is preferably 10 to 50° C. Furthermore, the dripping amount of the reaction liquid per unit area is preferably 10 to 60 wt %, based on the dripping amount of the aqueous ink.

It is preferable that the recording medium is composed of a non-absorbing substrate or a low-absorbing substrate. Examples of the non-absorbing substrate include a plastic film which has not been surface-treated for ink-jet printing (that is, an ink absorbing layer has not been formed thereon), as well as a substrate such as paper on which plastic has been coated, and a substrate on which a plastic film has been adhered. In addition, examples of the plastic include polyvinyl chloride, polyethylene terephthalate, polycarbonate, polystyrene, polyurethane, polyethylene, polypropylene, and the like. Examples of the low-absorbing substrate include actual printing stocks such as an art paper, a coated paper, and a matte paper. Additionally, a non-absorbing substrate or a low-absorbing substrate such as metal and glass may be used.

Examples which disclose the present embodiment more specifically will be shown below. In addition, the present invention is not limited to only these examples.

EXAMPLES

<Aqueous Ink>

(Preparation of Aqueous Ink)

According to the formulation shown in Table 1, an emulsion, a surfactant, an organic solvent, a pigment, and water were uniformly mixed using a mixing stirring device. Thereafter, a glass filter (manufactured by Kiriyama glass. CO.) was used to suction-filter this mixture, thereby, A1 to A4 aqueous inks were prepared.

(Assessment of Discharge Stability of Aqueous Ink)

Assessment of the discharge stability of A1 to A4 aqueous inks was performed by filling a cartridge DMC-11610 with the aqueous ink using an industrial ink-jet printer DMP-2831 (manufactured by Fujifilm Corporation), setting a dot space at 100 μm, a head gap at 500 μm, and a stage temperature at 40° C., performing solid printing of 150 mm×150 mm, and counting the number of nozzle slip-out before and after printing. In addition, among all of 16 nozzles, an aqueous ink having the number of nozzle slip-out of 3 or less was assessed to be 0, and an aqueous ink having the number of nozzle slip-out of 4 or more was assessed to be x. Results are shown in Table 1.

In A2 to A4 aqueous inks satisfying all of the requirements of the present invention, the discharge stability was good. Meanwhile, an A1 aqueous ink having a glass transition temperature of an emulsion of lower than 50° C., the discharge stability was inferior.

TABLE 1

|  | Aqueous ink |  | Tg of emulsion (° C.) | A1 | A2 | A3 | A4 |
|---|---|---|---|---|---|---|---|
| Formulation (parts by weight) | Emulsion | Mobinil 6969D | 70 | — | — | — | 8.0 |
|  |  | Mobinil 7980 | 55 | — | — | 8.0 | — |
|  |  | Mobinil 5450 | 53 | — | 8.0 | — | — |
|  |  | Mobinil 6530 | 30 | 8.0 | — | — | — |

TABLE 1-continued

| Aqueous ink | | Tg of emulsion (° C.) | A1 | A2 | A3 | A4 |
|---|---|---|---|---|---|---|
| Surfactant | BYK-348 | — | 2.0 | 2.0 | 2.0 | 2.0 |
| Organic solvent | 1,3-BD | — | 15.0 | 15.0 | 15.0 | 15.0 |
| Pigment | CAB-O-JET 352K | — | 3.0 | 3.0 | 3.0 | 3.0 |
| Water | | — | Balance | Balance | Balance | Balance |
| Discharge stability test (40° C. continuous discharge test) | | | x | ○ | ○ | ○ |

Mobinil 6969D: Acrylic emulsion [manufactured by The Nippon Synthetic Chemical Industry Co., Ltd.]
Mobinil 7980: Acrylic emulsion [manufactured by The Nippon Synthetic Chemical Industry Co., Ltd.]
Mobinil 5450: Acrylic/styrene emulsion [manufactured by The Nippon Synthetic Chemical Industry Co., Ltd.]
Mobinil 6530: Acrylic emulsion [manufactured by The Nippon Synthetic Chemical Industry Co., Ltd.]
BYK-348: Polyether-modified polydimethylsiloxane [manufactured by BYK-Chemie GmbH]
1,3-BD: 1,3-Butanediol [manufactured by KH Neochem Co., Ltd.]
CAB-O-JET 352K: Carbon black [manufactured by CABOT Corporation]

<Reaction Liquid>
(Preparation of Reaction Liquid)

According to the formulation shown in Table 2, an aggregating agent, 1,2-alkanediol, a glycol ether-based solvent, water, 1,3-butanediol, and a surfactant were uniformly mixed using a mixing stirring device, to prepare reaction liquids of B1 to B17.

(Assessment of Physical Properties of Reaction Liquid)

First, using a surface tension meter CBVP-Z (manufactured by Kyowa Interface Science Co., LTD.), a static surface tension was measured by the Wilhelmy method using a platinum plate. Results are shown in Table 2.

(Measurement of Dynamic Contact Angle)

Then, using a contact angle meter PG-X (manufactured by MATSUBO Corporation), 1.0 μL of the reaction liquid was added dropwise on a substrate of vinyl chloride media NM-SGF in a dynamic mode, and a dynamic contact angle after 3 seconds from contact with the substrate was measured. Results are shown in Table 2.

TABLE 2

| | Reaction liquid | | Boiling point of glycol ether-based solvent (° C.) | B1 | B2 | B3 | B4 | B5 | B6 | B7 | B8 |
|---|---|---|---|---|---|---|---|---|---|---|---|
| Formulation (parts by weights) | Aggregating agent | PAA-08 | — | 6.0 | 60 | 6.0 | 6.0 | 6.0 | 6.0 | 6.0 | 6.0 |
| | 1,2-Alkanediol | 1,2-HD | — | — | — | — | — | — | — | — | — |
| | | 1,2-OD | — | — | 2.0 | 2.0 | 2.0 | 2.0 | 2.0 | 2.0 | 2.0 |
| | 1,3-Butanediol | 1,3-BD | — | — | — | — | — | — | — | — | — |
| | Glycol ether-based solvent | BDG | 230.6 | 15.0 | — | — | — | — | — | — | — |
| | | MEDG | 176 | — | 15.0 | — | — | — | — | — | — |
| | | BTG | 271.2 | — | — | 15.0 | — | — | — | — | — |
| | | DMTG | 216 | — | — | — | 15.0 | — | — | — | — |
| | | BFDG | 231 | — | — | — | — | 15.0 | — | — | — |
| | | MFDG | 187 | — | — | — | — | — | 15.0 | — | — |
| | | MFTG | 242 | — | — | — | — | — | — | 15.0 | — |
| | | DMFTG | 215 | — | — | — | — | — | — | — | 15.0 |
| | Surfactant | BYK-348 | — | — | — | — | — | — | — | — | — |
| | Water | | — | Balance | Balance | Balance | Balance | Balance | Balance | Balance | Balance |
| Physical properties | Static surface tension (mN/m) | | | 28.5 | 25.2 | 28.7 | 23.9 | 28.4 | 28.1 | 28.3 | 28.0 |
| | Dynamic contact angle (after 3 sec) [°] | | | 24.6 | 20.4 | 34.2 | 24.8 | 21.7 | 21.1 | 24.2 | 23.8 |

| | Reaction liquid | | | B9 | B10 | B11 | B12 | B13 | B14 | B15 | B16 | B17 |
|---|---|---|---|---|---|---|---|---|---|---|---|---|
| Formulation (parts by weights) | Aggregating agent | PAA-08 | | 6.0 | 6.0 | 6.0 | 6.0 | 6.0 | 6.0 | 6.0 | 6.0 | 6.0 |
| | 1,2-Alkanediol | 1,2-HD | | — | — | — | — | 4.0 | 10.0 | — | — | — |
| | | 1,2-OD | | 2.0 | 2.0 | 2.0 | 0.1 | — | — | 2.0 | 2.0 | — |
| | 1,3-Butanediol | 1,3-BD | | 14.0 | — | — | — | — | — | 15.0 | — | — |
| | Glycol ether-based solvent | BDG | | — | — | — | — | — | — | — | — | — |
| | | MEDG | | — | — | — | — | — | — | — | — | — |
| | | BTG | | — | — | — | — | — | — | — | — | — |
| | | DMTG | | — | — | — | — | — | — | — | — | — |
| | | BFDG | | 1.0 | 30.0 | 40.0 | 15.0 | 15.0 | 15.0 | — | 15.0 | 15.0 |

TABLE 2-continued

|  |  | | | | | | | | | |
|---|---|---|---|---|---|---|---|---|---|---|
|  | MFDG | — | — | — | — | — | — | — | — | — |
|  | MFTG | — | — | — | — | — | — | — | — | — |
|  | DMFTG | — | — | — | — | — | — | — | — | — |
| Surfactant | BYK-348 | — | — | — | — | — | — | — | 2.0 | — |
|  | Water | Balance | Balance | Balance | Balance | Balance | Balance | Balance | Balance | Balance |
| Physical properties | Static surface tension (mN/m) | 24.0 | 23.4 | 23.0 | 27.0 | 30.2 | 29.5 | 24.0 | 25.9 | 31.6 |
|  | Dynamic contact angle (after 3 sec) [°] | 25.6 | 24.0 | 23.6 | 31.3 | 32.1 | 31.1 | 25.7 | 27.7 | 70.5 |

PAA-08: Polyallylamine [manufactured by NITTOBO MEDICAL CO., LTD]
1,2-HD: 1,2-Hexanediol [manufactured by Wako Pure Chemical Industries, Ltd.]
1,2-OD: 1,2-Octanediol [manufactured by Wako Pure Chemical Industries, Ltd.]
1,3-BD: 1,3-Butanediol [manufactured by KH Neochem Co., Ltd.]
BDG: Diethylene glycol monobutyl ether [manufactured by NIPPON NYUKAZAI Co., LTD.]
MEDG: Diethylene glycol methyl ethyl ether [manufactured by NIPPON NYUKAZAI Co., LTD.]
BTG: Triethylene glycol monobutyl ether [manufactured by NIPPON NYUKAZAI Co., LTD.]
DMTG: Triethylene glycol dimethyl ether [manufactured by NIPPON NYUKAZAI Co., LTD.]
BFDG: Dipropylene glycol monobutyl ether [manufactured by NIPPON NYUKAZAI Co., LTD.]
MFDG: Dipropylene glycol monomethyl ether [manufactured by NIPPON NYUKAZAI Co., LTD.]
MFTG: Tripropylene glycol monomethyl ether [manufactured by NIPPON NYUKAZAI Co., LTD.]
DMFTG: Tripropylene glycol dimethyl ether [manufactured by Wako Pure Chemical Industries, Ltd.]
BYK-348: Polyether-modified polydimethylsiloxane [manufactured by BYK-Chemie GmbH]

<Ink Set>

As shown in Table 3, using respective aqueous inks of A1 to A4, and respective reaction liquids of B1 to B17, ink sets of Examples 1 to 16 and Comparative Examples 1 to 4 were prepared. Using a printer UJF-3042HG (manufactured by MIMAKI ENGINEERING CO., LTD.) provided with ink sets of Examples 1 to 16 and Comparative Examples 1 to 4, an image sample of the size of 150 mm×100 mm was formed on vinyl chloride media NM-SGF at the printing concentration of aqueous ink 100% and reaction liquid 30%. The image sample was formed by printing an aqueous ink after a reaction liquid, and thereafter, performing additional drying at 40° C. for 30 minutes, 60° C. for 10 minutes, or 90° C. for 5 minutes, using a drying machine FV-320 (manufactured by Toyo Roshi Kaisha, Ltd.). In addition, a stage temperature was set at 40° C. Assessment of coated film properties of respective image samples was performed as follows:

(Assessment of Rubbing Resistance)

After a load of 1.0 kgf was applied to an eraser having a cross section 7φ, and the printing surface of each image sample was reciprocated 30 times, a peeling degree of a coated film was assessed. And, this assessment was expressed by scoring of numerical values of 10 (high rubbing resistance) to 1 low rubbing resistance) in an order from the higher rubbing resistance. Results are shown in Table 3. In addition, an image having a score of 4 or more was determined to be accepted.

(Adherence)

The surface of a pressure-sensitive adhesive layer side of a pressure-sensitive adhesive sheet [Cellotape (registered trademark) (manufactured by NICHIBAN CO., LTD.)] was stuck to the printing surface of each image sample, and a peeling operation was performed. The adherence was assessed according to the following criteria. Results are shown in Table 3.

○(Good): A printed matter was not peeled at all.

Δ (Fair): A printed matter was partially peeled.

x (Bad): The entire surface of a printed matter at a part to which a pressure-sensitive adhesive sheet had been stuck was peeled.

(Appearance)

The printing surface of each image sample was checked visually, and the presence or absence of color unevenness and beading was observed. When there was not color unevenness, beading, or another deteriorated appearance, appearance was determined to be 0, and when there was deterioration in appearance, appearance was determined to be x. Results are shown in Table 3.

TABLE 3

|  | Aqueous ink | Reaction liquid | Coated film properties | | | | | | | | |
|---|---|---|---|---|---|---|---|---|---|---|---|
|  |  |  | 40° C. 30 min | | | 60° C. 10 min | | | 90° C. 5 min | | |
|  |  |  | Rubbing resistance | Adherence | Appearance | Rubbing resistance | Adherence | Appearance | Rubbing resistance | Adherence | Appearance |
| Example 1 | A4 | B1 | 6 | ○ | ○ | 7 | ○ | ○ | 9 | ○ | ○ |
| Example 2 | A4 | B2 | 6 | ○ | ○ | 7 | ○ | ○ | 9 | ○ | ○ |
| Example 3 | A4 | B3 | 6 | ○ | ○ | 7 | ○ | ○ | 9 | ○ | ○ |
| Example 4 | A4 | B4 | 6 | ○ | ○ | 7 | ○ | ○ | 9 | ○ | ○ |
| Example 5 | A4 | B5 | 6 | ○ | ○ | 7 | ○ | ○ | 9 | ○ | ○ |
| Example 6 | A4 | B6 | 6 | ○ | ○ | 7 | ○ | ○ | 9 | ○ | ○ |
| Example 7 | A4 | B7 | 6 | ○ | ○ | 7 | ○ | ○ | 9 | ○ | ○ |
| Example 8 | A4 | B8 | 6 | ○ | ○ | 7 | ○ | ○ | 9 | ○ | ○ |
| Example 9 | A4 | B9 | 4 | ○ | ○ | 5 | ○ | ○ | 9 | ○ | ○ |
| Example 10 | A4 | B10 | 9 | ○ | ○ | 9 | ○ | ○ | 10 | ○ | ○ |
| Example 11 | A4 | B11 | 9 | ○ | ○ | 9 | ○ | ○ | 10 | ○ | ○ |
| Example 12 | A4 | B12 | 6 | ○ | ○ | 7 | ○ | ○ | 9 | ○ | ○ |
| Example 13 | A4 | B13 | 6 | ○ | ○ | 7 | ○ | ○ | 9 | ○ | ○ |
| Example 14 | A4 | B14 | 6 | ○ | ○ | 7 | ○ | ○ | 9 | ○ | ○ |

TABLE 3-continued

| | | | Coated film properties | | | | | | | |
|---|---|---|---|---|---|---|---|---|---|---|
| | | | 40° C. 30 min | | | 60° C. 10 min | | | 90° C. 5 min | | |
| | Aqueous ink | Reaction liquid | Rubbing resistance | Adherence | Appearance | Rubbing resistance | Adherence | Appearance | Rubbing resistance | Adherence | Appearance |
| Example 15 | A3 | B4 | 5 | ○ | ○ | 6 | ○ | ○ | 8 | ○ | ○ |
| Example 16 | A2 | B4 | 5 | ○ | ○ | 6 | ○ | ○ | 8 | ○ | ○ |
| Comparative Example 1 | A1 * | B4 | 3 | ○ | ○ | 4 | ○ | ○ | 4 | ○ | ○ |
| Comparative Example 2 | A4 | B15 * | 3 | x | ○ | 4 | ○ | ○ | 8 | ○ | ○ |
| Comparative Example 3 | A4 | B16 * | 5 | x | ○ | 6 | x | ○ | 8 | Δ | ○ |
| Comparative Example 4 | A4 | B17 * | 6 | ○ | x | 7 | ○ | x | 9 | ○ | x |

* means outside the range defined in the present invention.

As seen from results of Table 3, in ink sets of Examples 1 to 16 satisfying all of the requirements of the present invention, the rubbing resistance, the adherence and the appearance of the formed images were good.

On the other hand, in the ink set of Comparative Example 1, since a glass transition temperature of an emulsion contained in the aqueous ink is lower than 50° C., the rubbing resistance of the formed image was inferior.

In the ink set of Comparative Example 2, since the glycol ether-based solvent is not contained in the reaction liquid, the rubbing resistance and the adherence of an image formed by low temperature drying were inferior.

In the ink set of Comparative Example 3, since the surfactant is contained in the reaction liquid, the adherence of the formed image was inferior.

In the ink set of Comparative Example 4, since 1,2-alkanediol is not contained in the reaction liquid, the appearance of the formed image was inferior.

INDUSTRIAL APPLICABILITY

The ink set of the present invention is provided with an aqueous ink excellent in the discharge stability, and can form an image excellent in coated film properties such as the rubbing resistance and the adherence. Hence, the ink set of the present invention can be suitably used as an ink set for ink-jet printing.

The invention claimed is:

1. An ink set for ink-jet printing comprising an aqueous ink and a reaction liquid,
wherein the aqueous ink contains an emulsion, a surfactant, an organic solvent, a pigment, and water,
the reaction liquid contains an aggregating agent, 1,2-alkanediol, a glycol ether-based solvent and/or a glycol ether acetate-based solvent, and water, wherein the reaction liquid does not contain a surfactant, and
the emulsion has a glass transition temperature of 50° C. or higher.

2. The ink set for ink-jet printing according to claim 1, wherein the glycol ether-based solvent is one or more selected from diethylene glycol monobutyl ether, diethylene glycol methyl ethyl ether, triethylene glycol monobutyl ether, triethylene glycol dimethyl ether, dipropylene glycol monobutyl ether, dipropylene glycol monomethyl ether, tripropylene glycol monomethyl ether, and tripropylene glycol dimethyl ether.

3. The ink set for ink-jet printing according to claim 1, wherein the reaction liquid has a dynamic contact angle after 3 seconds from contact with a recording medium of 40° or less.

4. The ink set for ink-jet printing according to claim 2, wherein the reaction liquid has a dynamic contact angle after 3 seconds from contact with a recording medium of 40° or less.

5. The ink set for ink-jet printing according to claim 1, wherein the aggregating agent is a water-soluble cationic polymer.

6. The ink set for ink-jet printing according to claim 2, wherein the aggregating agent is a water-soluble cationic polymer.

7. The ink set for ink-jet printing according to claim 3, wherein the aggregating agent is a water-soluble cationic polymer.

8. The ink set for ink-jet printing according to claim 4, wherein the aggregating agent is a water-soluble cationic polymer.

9. An ink-jet recording method for forming an image on a recording medium using the ink set for ink-jet printing as defined in claim 1, comprising discharging an aqueous ink and a reaction liquid from an ink-jet head so as to bring the aqueous ink and the reaction liquid into contact with each other on the recording medium.

10. The ink-jet recording method according to claim 9, wherein the recording medium is composed of a non-absorbing substrate or a low-absorbing substrate.

* * * * *